(12) United States Patent
Lee (10) Patent No.: US 7,098,565 B2
(45) Date of Patent: Aug. 29, 2006

(54) CORE-COIL ASSEMBLY OF MOTOR AND MANUFACTURING METHOD THEREOF

(75) Inventor: Ho-Jae Lee, Gimhae (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/960,095

(22) Filed: Oct. 8, 2004

(65) Prior Publication Data
US 2005/0242670 A1 Nov. 3, 2005

(30) Foreign Application Priority Data
Apr. 29, 2004 (KR) ............... 10-2004-0030198
Apr. 29, 2004 (KR) ............... 10-2004-0030199
Apr. 29, 2004 (KR) ............... 10-2004-0030201

(51) Int. Cl.
H02K 1/00 (2006.01)
H02K 1/18 (2006.01)
H02K 1/28 (2006.01)
H02K 3/00 (2006.01)

(52) U.S. Cl. .................... 310/194; 310/217
(58) Field of Classification Search .......... 310/194, 310/43, 216–218; 335/282; 336/206, 208
See application file for complete search history.

(56) References Cited

U.S. PATENT DOCUMENTS

| 2,607,816 A * | 8/1952 | Ryder et al. .......... 310/42 |
| 2,695,969 A * | 11/1954 | Yates .......... 310/259 |
| 6,111,334 A * | 8/2000 | Horski et al. .......... 310/254 |
| 6,304,018 B1 * | 10/2001 | Ham et al. .......... 310/216 |
| 6,348,753 B1 * | 2/2002 | Sakai et al. .......... 310/254 |
| 6,555,942 B1 * | 4/2003 | Hsu .......... 310/208 |
| 6,573,632 B1 * | 6/2003 | Hsu .......... 310/216 |
| 2002/0079780 A1 * | 6/2002 | Muszynski .......... 310/218 |
| 2004/0021393 A1 * | 2/2004 | Suzuki et al. .......... 310/218 |

FOREIGN PATENT DOCUMENTS

KR 10-1993-0015253 7/1993

* cited by examiner

*Primary Examiner*—Tran Nguyen
(74) *Attorney, Agent, or Firm*—Birch, Stewart, Kolasch, and Birch, LLP

(57) ABSTRACT

A core-coil assembly includes: a plurality of teeth parts radially arranged with their pole portions, which are formed at their one ends, forming an inner circumference; a molding part partially molded onto the teeth parts, forming inner sides of the teeth parts to be connected to one another while forming outer sides of the teeth parts to be isolated at regular intervals and having a molded outer circumferential surface around which a coil is wound; a yoke part having a ring shape and coupled to an outer side, which is not molded to be exposed, of each teeth part to form a magnetic path, so that an assembling process is simplified to thereby improve productivity of a motor, a height difference between the teeth parts is prevented and a coil is wound regularly to thereby improve efficiency of a motor.

18 Claims, 9 Drawing Sheets

CORE-COIL ASSEMBLY OF MOTOR AND MANUFACTURING METHOD THEREOF

This Non-provisional application claims priority under 35 U.S.C. § 119(a) on Patent Application No(s). 10-2004-0030198; 10-2004-0030199 and 10-2004-0030201 filed in Korea, Republic of on Apr. 29, 2004, the entire contents of which are hereby incorporated by reference.

BACKGROUND OF THE INVENTION

1. Field of the Invention

The present invention relates to a motor, and particularly, to a core-coil assembly of a motor and its manufacturing method capable of improving productivity and efficiency of an inner teeth type motor in which teeth parts around which a coil is wound are disposed inwardly.

2. Description of the Background Art

In general, a motor is used as a core driving source of most electronic and electrical products, such as a compressor, a washing machine and an electric fan. Improving productivity is increasingly considered as a main issue in production of such a motor. Here, one of main problems in improving productivity in a manufacturing process is generated when a coil is wound.

A motor can be commonly divided into an outer teeth type and an inner teeth type according to a position of teeth parts around which a coil is wound.

In the outer teeth type motor, a coil is wound in an outer winding method in which the coil is wound from an outer side of the teeth part while, in the inner teeth type motor, a coil is wound in an inner winding method in which the coil is wound from an inner side of the teeth part.

Generally, in the inner teeth type motor, the teeth parts around which a coil is wound are used as a stator, and a rotor comprised of a permanent magnet or a core around which another coil is wound is located therein. In case of an inner teeth type, it is difficult to wind a coil. For this reason, a separate core method is widely used, in which a core-coil assembly is manufactured by separately manufacturing a yoke part and a teeth part of a core, winding a coil around the teeth part and assembling the coil wound teeth part with the yoke part. For instance, U.S. Pat. No. 6,573,632B2 discloses a kind of a separate core method.

Figure 1:
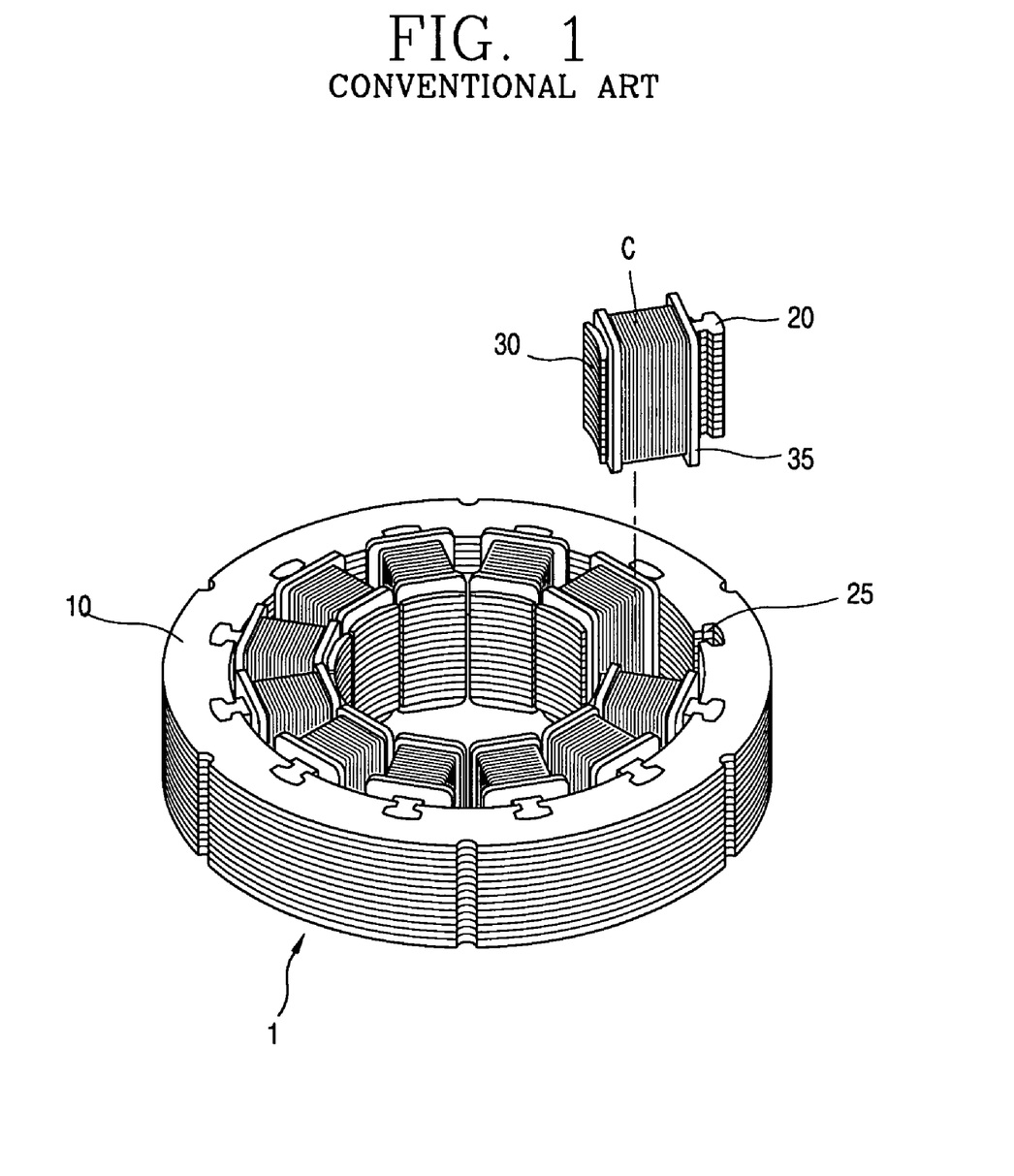
FIG. 1 is a perspective view showing a conventional inner teeth type core-coil assembly.
Figure 2:
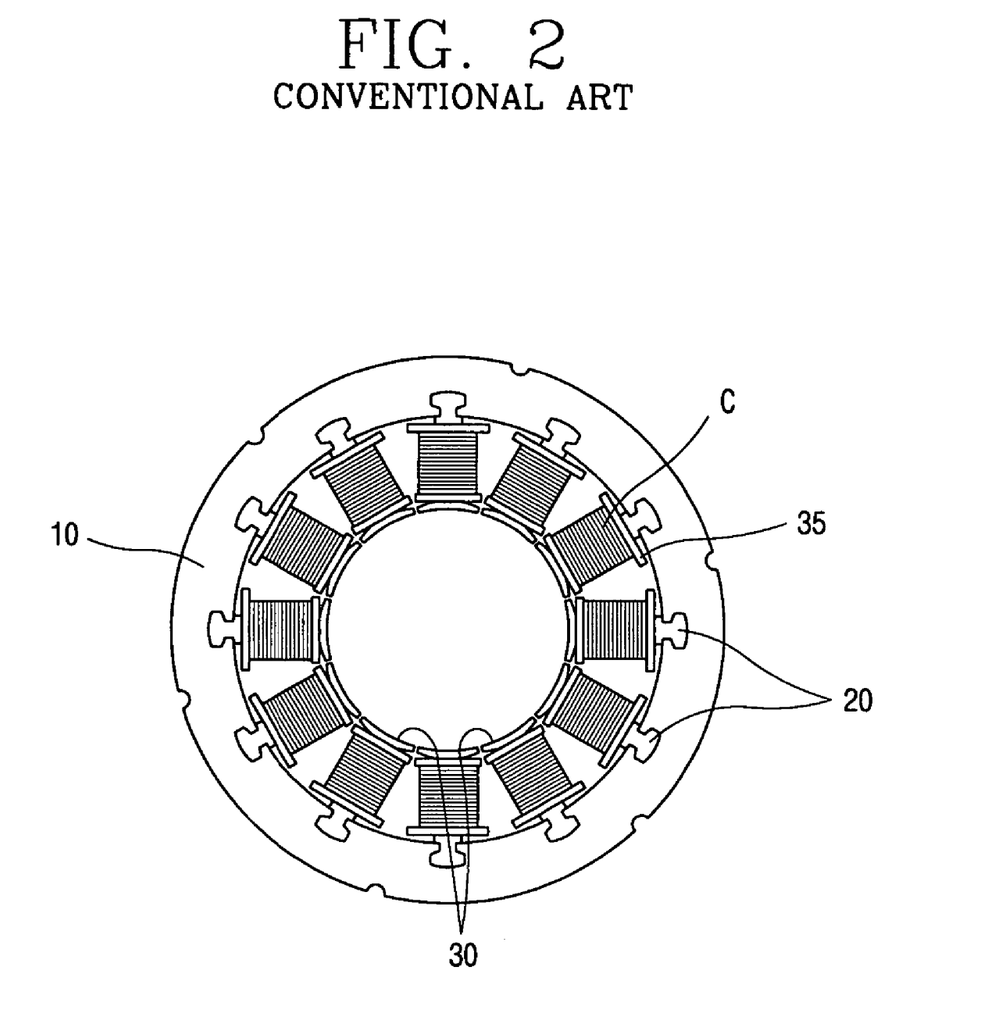
FIG. 2 is a plan view showing the conventional inner teeth type core-coil assembly.

An assembling method for an inner teeth type core-coil assembly in accordance with another conventional art similar to the above-mentioned art is depicted in FIGS. 1 and 2. FIG. 1 is a perspective view showing a conventional inner teeth type core-coil assembly, and FIG. 2 is its plan view.

As shown, the conventional inner teeth type core-coil assembly 1 includes a yoke part 10 formed by stacking (laminating) ring-shaped core thin boards one upon another to form a magnetic path; and a few teeth parts 20 formed by stacking "T"-shaped core thin boards one upon another and radially coupled onto an inner circumferential surface of the yoke part 10, so that a coil (C) is wound therearound.

A teeth insertion groove 25 in which the teeth part 20 is inserted is formed in an inner circumferential surface of the yoke part 10 in a stepped manner.

One end of the teeth part 20 is formed in a stepped manner, corresponding to the teeth insertion groove 25 of the yoke part 10, and its other end is extendingly formed as a pole portion 30 with an arc shape.

A bobbin 35 having a quadrangular column shape and made of a insulation material is inserted onto an outer circumferential surface of a middle portion of the teeth part 20 in its longitudinal direction.

A coil (C) is wound around an outer circumferential surface of the bobbin 35, and both ends of the bobbin 35 are extendingly formed to be higher than a height of its coil (C)-wound body so that the winding coil (C) may not be deviated.

However, in such a separate core method, the teeth parts 20 are individually manufactured, the coil (C) is wound around each teeth part 20, and the coil wound teeth parts are individually assembled with the yoke part 10. For this reason, a manufacturing time and an assembling process are delayed, thereby deteriorating productivity.

In addition, inconvenience may occur because the coil (C) wound around each teeth part 20 should be connected on a separate printed circuit board (PCB) by an electrical means, soldering or the like after the assembling operation.

Besides, when each teeth part 20 is inserted in the teeth insertion groove 25, the pole portions 30 may not form a perfect circle because of an assembly error generated due to fine differences in shape. Accordingly, in this case, when a permanent magnet or the like is inserted in the core-coil assembly 1, a constant distance between the permanent magnet or the like and the pole portion 30 is not achieved, thereby causing a torque change due to a change of flux in operation of a motor.

SUMMARY OF THE INVENTION

Therefore, an object of the present invention is to provide a core-coil assembly of a motor and its manufacturing method capable of improving productivity and efficiency of a motor by sequentially winding a winding coil in an outer winding method, preventing separation between core plates of each teeth part, which is caused by molding pressure when injecting a molding liquid, regularly winding a coil by a stable rotation in coil winding.

To achieve these and other advantages and in accordance with a purpose of the present invention, as embodied and broadly described herein, there is provided a core-coil assembly comprising: a plurality of teeth parts radially arranged with their pole parts, which are formed at their one ends, forming an inner circumference; a molding part partially molded onto the teeth parts, forming inner sides of the teeth parts to be connected to one another while forming outer sides of the teeth parts to be isolated at regular intervals and having a molded outer circumferential surface around which a coil is wound; and a yoke part having a ring shape and coupled to an outer side, which is not molded to be exposed, of each teeth part to form a magnetic path.

To achieve these and other advantages and in accordance with a purpose of the present invention, as embodied and broadly described herein, there is provided a manufacturing method of a core-coil assembly of a motor comprising: a first step of manufacturing a few teeth parts by stacking a plurality of "T" shaped core thin boards one upon another and simultaneously manufacturing one yoke part by stacking a plurality of circular core thin boards one upon another; a second step of radially arranging and inserting a few teeth parts in a mold and forming a molding part on an outer circumferential surface of each teeth part to connect the inner sides of the teeth parts by injecting a molding liquid in the mold and performing a predetermined hardening process thereon; a third step of drawing out a temporary assembly comprised of the teeth part and a molding part from the mold and winding a coil around an outer circumferential surface of each teeth part by a winder; and a fourth step of insertedly coupling an outer end of each teeth part onto the yoke part.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The spirit of the present invention may be modified to be used for a rotary motor, such as a DC motor, a BLDC motor or the like as well as for a linear motor or the like.

Figure 3A:
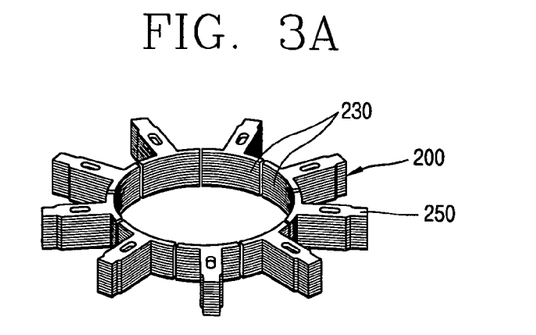
FIG. 3A is a perspective view showing that a plurality of teeth parts are arranged before molding.
Figure 3B:
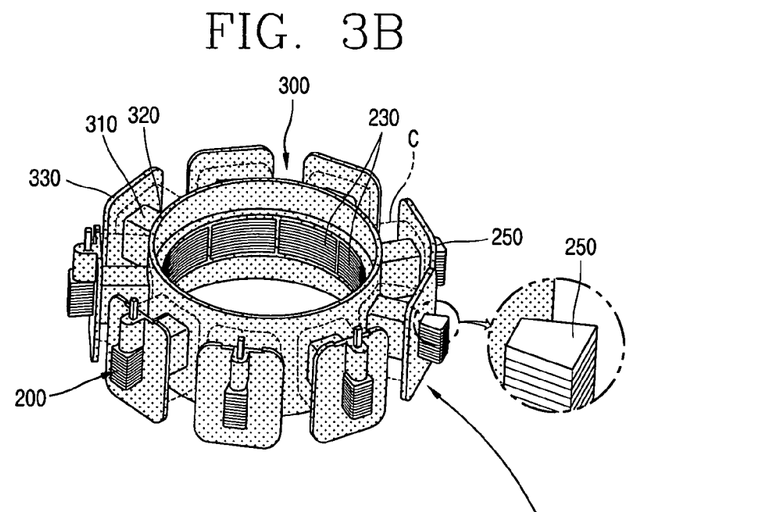
FIG. 3B is a perspective view showing the teeth parts after molding.
Figure 3C:
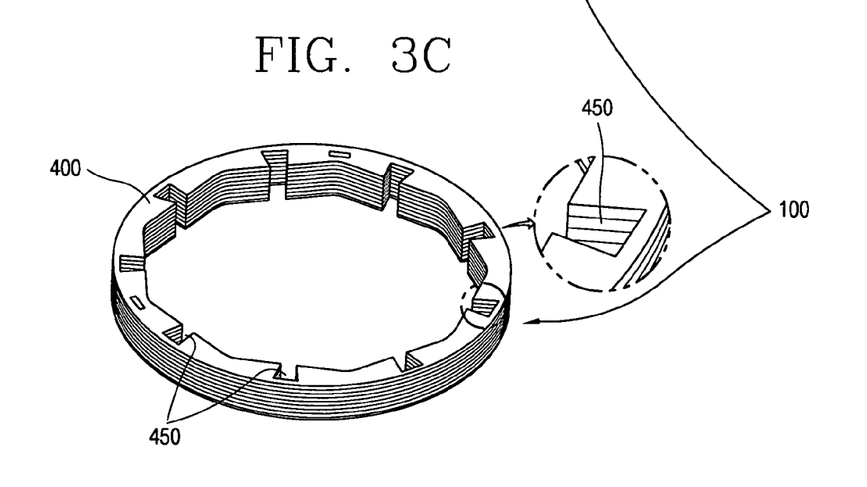
FIG. 3C is a perspective view showing a yoke part.

FIG. 3 is a perspective view of a core-coil assembly of a motor in accordance with the first embodiment of the present invention, wherein FIG. 3A is a perspective view showing that a plurality of teeth parts are arranged before molding, FIG. 3B is a perspective view showing the teeth parts after the molding, and FIG. 3C is a perspective view showing a yoke part.

As shown, a core-coil assembly 100 of a motor in accordance with the present invention includes: a plurality of teeth parts 200 radially arranged with their pole portions 23 (formed at their one ends) forming an inner circumference; a molding part 300 partially molded onto the teeth parts 200, forming inner sides of the teeth parts 200 to be connected to one another while forming outer sides of the teeth parts 200 to be isolated at regular intervals and having a molded outer circumferential surface around which a coil (C) is wound; and a yoke part 400 coupled to outer sides, which are not molded to be exposed, of the teeth parts 200 to form a magnetic path and having a ring shape.

As shown in FIG. 3A, each teeth part 200 has a rough "T" shape, and its portion with a wide width has an arc shape to thereby form a pole portion 230, and the pole portions 230 form an intermittent inner circumference at inner ends of the teeth parts 200. In order to form the intermittent inner circumference, a plurality of teeth parts 200 are radially disposed with their pole portions 230 being out of contact with one another. In molding, a portion encompassing both sides of the pole portion 230 in an axial direction is filled with a molding liquid, thereby insulating the teeth parts 200 from one another.

A stopping protrusion 250 is formed at an outer end of each teeth part 200 in a stepped manner, corresponding to a stopping groove 450 formed at the yoke part 400.

The teeth part 200 is formed such that core thin boards are stacked (laminated) one upon another and coupled by a mac method. As for the mac method, a part of a thin board is transformed by applying an impact thereto so that upper and lower plates are coupled.

Preferably, the core thin board is a silicon steel sheet.

Each stopping protrusion 250 is wide at its end portion and gets narrower along its longitudinal direction. The stopping protrusions 250 should not be insulated in order to form a magnetic path by being coupled to the yoke part 400. Accordingly, the portion where the stopping protrusion 250 is formed should not be molded in molding.

If the stopping protrusion 250 corresponds to the stopping groove 450 to be coupled thereto, its shape may be varied.

The molding part 300 includes: a middle molding portion 310 encompassing an outer side of the teeth part 200; an inner molding portion 320 extendingly formed at an inner circumferential side of the middle molding portion 310 at a predetermined height and having a circular belt shape so that the teeth parts 200 are connected to one another; and an outer molding portion 330 extendingly formed at an outer circumferential side of the middle molding portion 310 at a predetermined height and having a plate shape so that the teeth parts 220 are isolated.

The middle molding portion 310 has a "T" shape to be the same shape as the teeth part when projected onto plane. Here, in order to insulate neighboring teeth parts 200, an inner end of the middle molding portion 310 is formed to a portion encompassing both sides of the pole portion 130 in an axial direction while its outer end is formed to a portion where the stopping protrusion 250 of the teeth part 200 starts.

The inner molding portion 320 is formed at a place, which is slightly isolated from the pole portion 130 in an outward radial direction to be protrusive in a perpendicular direction. In order to support a coil (C), preferably, the inner molding portion protrudes almost as high as the thickness of the coil(C) when it is completely wound.

As described, the outer molding portion 330 is formed at a portion where the stopping protrusion 250 is formed, of the teeth part 200 to be protrusive in a perpendicular direction. Here, preferably, the outer molding portion 330 protrudes almost as high as the thickness of the coil (C) when it is completely wound. In addition, preferably, a corner of the outer molding portion is rounded so that the coil (C) can be wound easily.

In addition, the outer molding portion 330 may have a flat plate shape but may be formed, in some cases, to have an arc-shaped sectional shape curved at a curvature that is the same as that of the inner molding portion 320 when projected onto plane.

The yoke part 400 is formed as a ring shape, and a stopping groove 450 is formed in an inner circumferential surface of the yoke part 400 in a stepped manner. Herein, the stopping groove 450 gets wider along a radial direction so that the stopping protrusion 250 of the teeth part 200 is pressingly inserted thereinto.

The yoke part 400 may be formed as a whole, or may be formed such that core thin boards are stacked and then coupled. In case of forming the yoke part 400 by stacking, the core thin board is formed as a silicon steel sheet.

Figure 4:
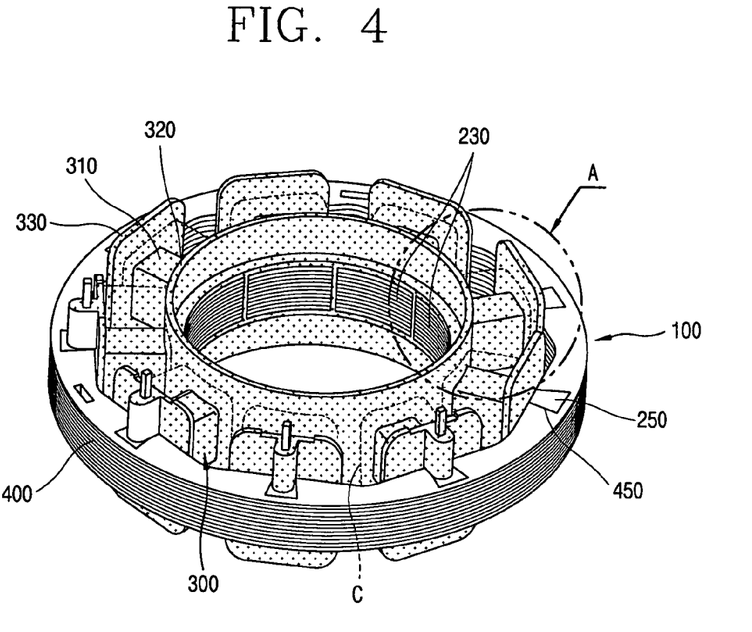
FIG. 4 is a perspective view showing a yoke part coupled to molded teeth parts in accordance with a first embodiment of the present invention.
Figure 5:
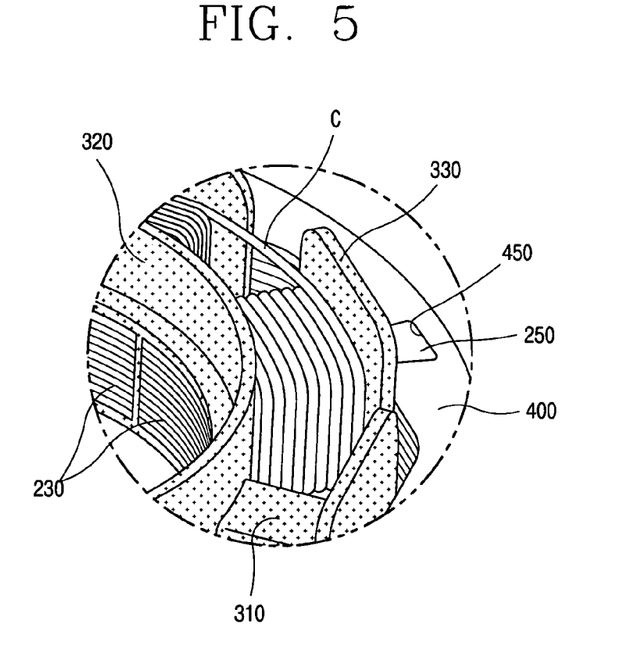
FIG. 5 is an enlarged view showing part A of FIG. 4.

FIG. 4 is a perspective view showing a yoke part coupled to a molded teeth part in accordance with the first embodiment of the present invention, and FIG. 5 is an enlarged view showing part A of FIG. 4.

As shown, a coil is wound around an outer side of the teeth part 200 corresponding to the middle molding portion 310 by using a winder (not shown). Thereafter, the stopping protrusion 250 is assembled into the stopping groove 450. As in the above described art, because the stopping protrusion 250 is not molded (not covered), the stopping protrusion forms a magnetic path together with the yoke part 400 by being inserted in the stopping groove 450.

Figure 6:
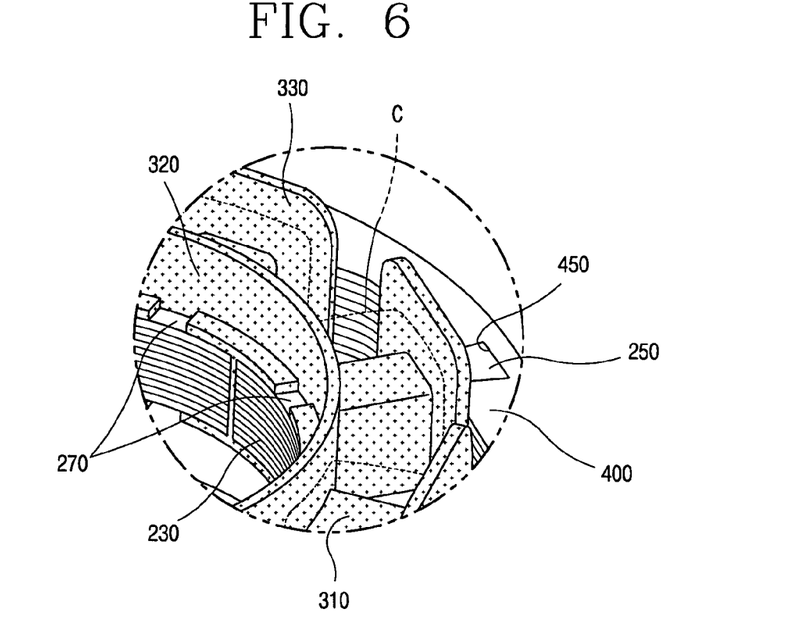
FIG. 6 is a perspective view showing a portion corresponding to part A of FIG. 4 in accordance with a second embodiment of the present invention.

FIG. 6 is a perspective view showing a part corresponding to part A of FIG. 4 in accordance with a second embodiment of the present invention.

As shown, the middle molding portion 310 is formed as a "T" shape when projected onto plane in the same manner as the shape of the teeth part 200. Here, as in the first embodiment, an inner end of the middle molding portion 310 is formed to a portion encompassing both sides of the pole portion 130 in an axial direction so as to insulate neighboring teeth parts 200 while an outer end is formed to a portion where the stopping protrusion 250 of the teeth part 200 starts. Preferably, a core pressing groove 270 is formed at a middle portion of the pole portion 230 of each teeth part 200 by pressing the middle portion as well as the stopping protrusion 250 using a mold, whereby a molding liquid is not applied to the middle portion during molding and thus is exposed after the molding. Namely, the stopping protrusion 250 portion, an outer side of each teeth part 200 and the core pressing groove 270, an inner side of each teeth part 200, are pressed and supported by a mold, thereby preventing the separation between thin boards constructing each teeth part 200, which is caused by molding pressure, and also preventing a height difference between teeth parts 200 from occurring. Accordingly, efficiency of a motor can be improved.

Figure 7:
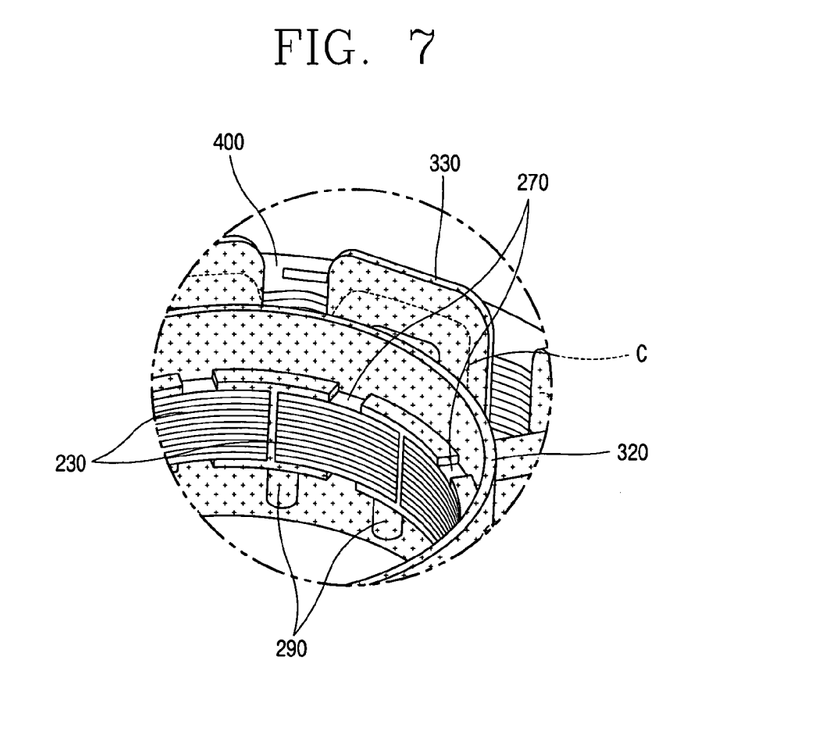
FIG. 7 is a perspective view showing a portion corresponding to part A of FIG. 4 in accordance with a third embodiment of the present invention.
Figure 8:
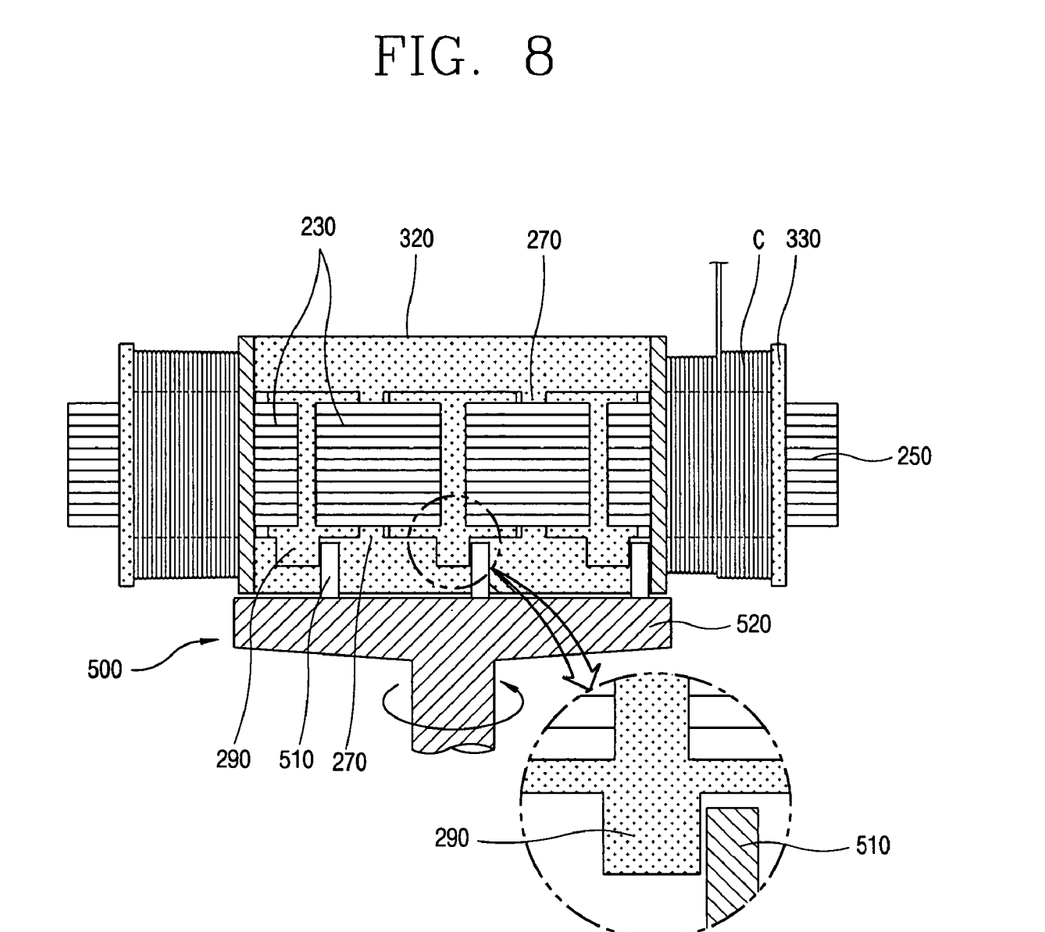
FIG. 8 is a sectional view showing that a coil is wound using a winder in a core-coil assembly of a motor in accordance with the third embodiment of the present invention.

FIG. 7 is a perspective view showing a part corresponding to part A of FIG. 4 in accordance with a third embodiment of the present invention, and FIG. 8 is a sectional view showing that a coil is wound by a winder in a core-coil assembly of a motor in accordance with the third embodiment of the present invention.

As shown, as in the first embodiment, the middle molding portion 310 is formed as a "T" shape when projected onto plane in the same manner as the shape of the teeth part 200. Here, an inner end of the middle molding portion 310 is formed to a portion encompassing both sides of the pole portion 230 in an axial direction so as to insulate neighboring teeth parts 200 while its outer end is formed to a portion where the stopping protrusion 250 of the teeth part 200 starts. Besides, a plurality of winding stopping protrusions 290 are straightly formed at the inner molding portion 320 at regular intervals so that a stopping portions 510 of a winder table 520 are stopped thereby when the winder 500 is mounted and rotated.

Preferably, the winding stopping protrusion 290 is straightly formed between the teeth parts 200.

When a coil is wound around the teeth part 200, a winder 500 is rotated to wind a coil around the teeth part 200 in a state that the stopping portion 510 of the winder table 520 adheres closely to the winding stopping protrusion 290. Thereafter, the winder table 520 is rotated at a certain angle, so it can be moved to a position where a coil can be wound around a neighboring teeth part 200. At this time, the stopping portion 510 of the winder table 520 is rotated together by being caught by the winding stopping protrusion 290. Preferably, an angle at which the winder table 520 is rotated is 360°/N, wherein N refers to the number of teeth parts 200.

When the coil is successively wound around the teeth part by using the winder 500, the winder 500 is rotated with its stopping protrusion 510 caught by the winding stopping protrusion 290. Accordingly, a temporary assembly comprised of the teeth part 200 and the molding part 300 are stably rotated, thereby maintaining a good wound state of the coil, improving productivity due to a smooth winding operation for coil, and improving performance of a motor.

A manufacturing method of a core-coil assembly of a motor will now be described.

Figure 9A:
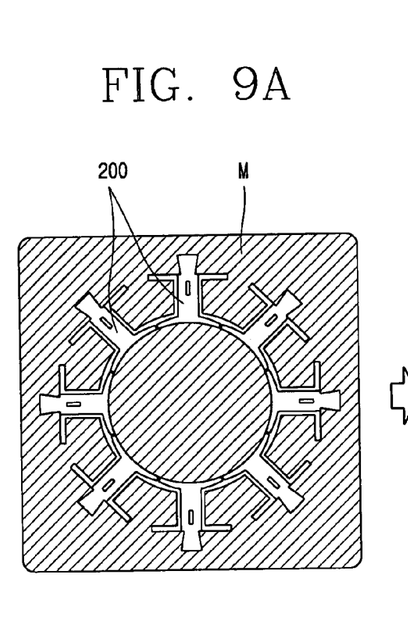
FIGS. 9A to 9D are plan views showing a manufacturing process of a core-coil staked (laminated) body of a motor in accordance with the first embodiment of the present invention.
Figure 9B:
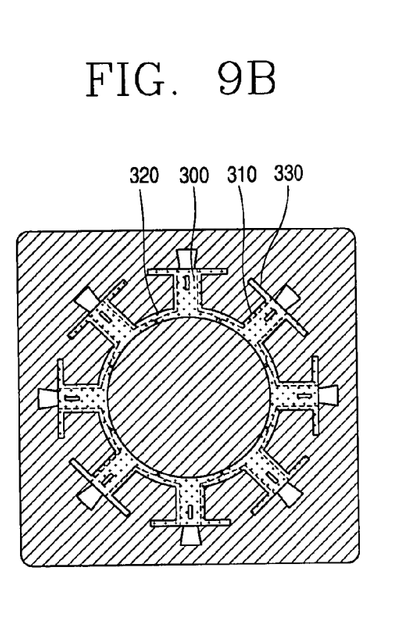
Figure 9C:
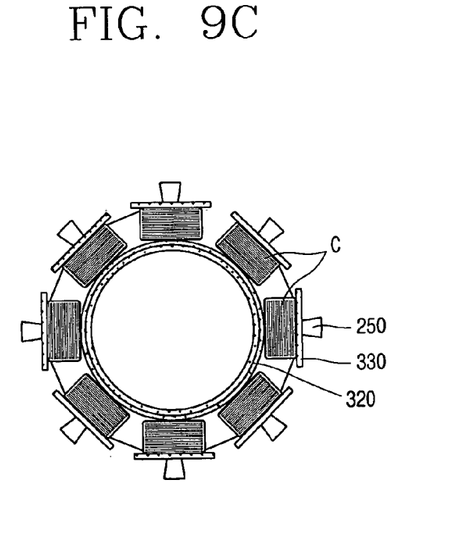
Figure 9D:
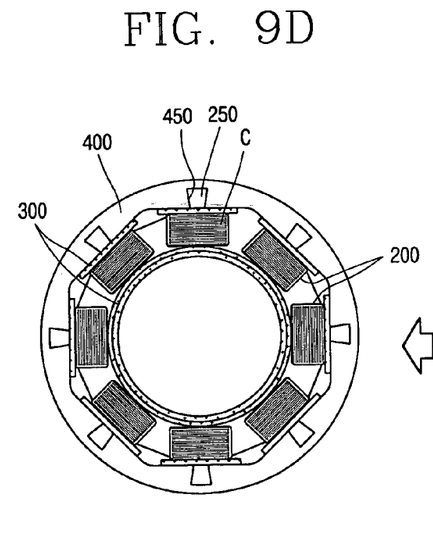
Figure 10:
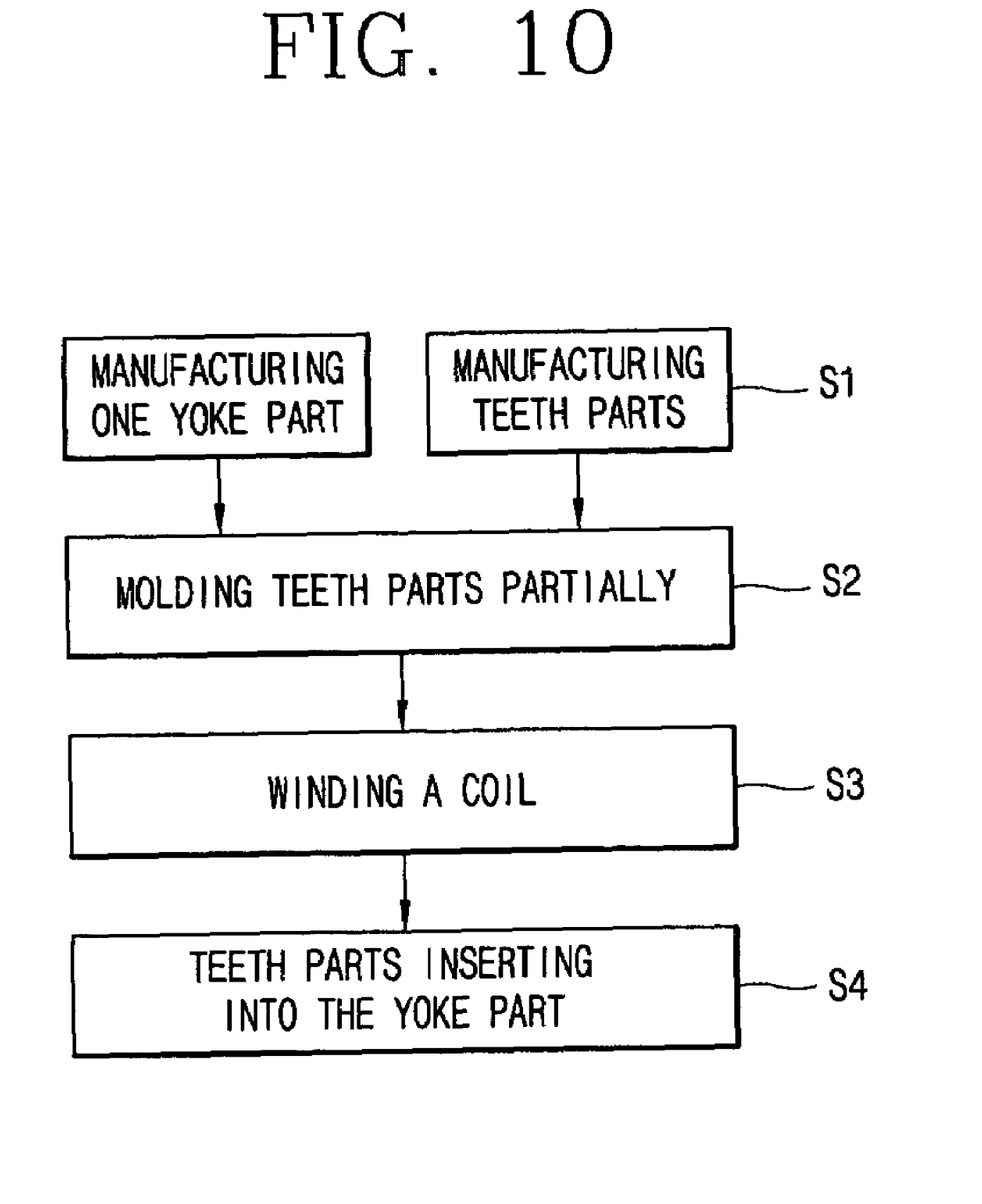
FIG. 10 is a block diagram showing a manufacturing process of the core-coil stacked body of the motor in accordance with the first embodiment of the present invention.

FIGS. 9A to 9D are plan views showing a manufacturing process of a core-coil stacked body of a motor in accordance with the first embodiment, and FIG. 10 is a block diagram showing a manufacturing process of a core-coil stacked body of a motor in accordance with the first embodiment of the present invention.

As shown, the manufacturing method of the core-coil stacked body of a motor includes a first step of manufacturing a few teeth parts 200 by stacking (laminating) a plurality of "T" shaped core thin boards one upon another and simultaneously manufacturing one yoke part 400 by stacking a plurality of circular core thin boards one after another; a second step of radially arranging and inserting a few teeth parts 200 in a mold (M) and forming a molding part 300 on an outer circumferential surface of each teeth parts to connect the inner sides of the teeth parts 200 by injecting a molding liquid in the mold (M); a third step of drawing out a temporarily-manufactured assembly comprised of the teeth part 200 and the molding part 300 from the mold (M) and winding a coil (C) around an outer circumferential surface of each teeth part 200 with a winder; and a fourth step of insertedly coupling an outer end of each teeth part 200 to the yoke part 400.

First, as shown in FIG. 9A, the first step includes forming teeth parts 200 by stacking a plurality of "T" shaped core thin boards one upon another and then radially arranging and inserting the teeth parts 200 in a mold (M) having a predetermined shape. In addition, one yoke part is separately manufactured by stacking a plurality of circular core thin boards (not shown) one upon another. In case of wholly forming the teeth part 200 or the yoke part without stacking, stacking operation is not required (S1).

Next, as shown in FIG. 9B, the second step includes injecting a molding liquid of insulation material such a resin into the mold to fill a gap between an outer circumferential surface of the teeth part 200 and an inner circumferential surface of the mold (M) with the molding liquid. Thereafter, by performing a hardening process thereon for a certain time, the molding liquid is hardened to form a molding part 300 comprising a middle molding portion 310, an inner molding portion 320 and an outer molding portion 330. At this time, the stopping protrusion 250 is not molded so as to form a magnetic path together with the yoke part 400 when inserted in the stopping groove 450 (S2).

Thereafter, as shown in FIG. 9C, the third step includes drawing out the teeth part 200 temporarily assembled by the inner molding portion 320 from the mold (M) and then winding a coil (C) around an outer circumferential surface of the teeth part 200, more precisely, an outer circumferential surface of the middle molding portion 310 by a winder (not shown). At this time, a coil (C) is wound in an outer winding method of winding a coil from an outer side of the teeth part 200 to its inner side (S3).

Then, as shown in FIG. 9D, the fourth step includes pressingly inserting the yoke part 400 onto the outer end of each teeth part 200. At this time, a stopping protrusion 250 is formed at an outer end of the teeth part 200 in a stepped manner while a stopping groove 450 is formed in an inner circumferential surface of the yoke part 400 in a stepped manner, thereby firmly assembling the teeth part 200 and the yoke part 400 (S4).

Figure 11:
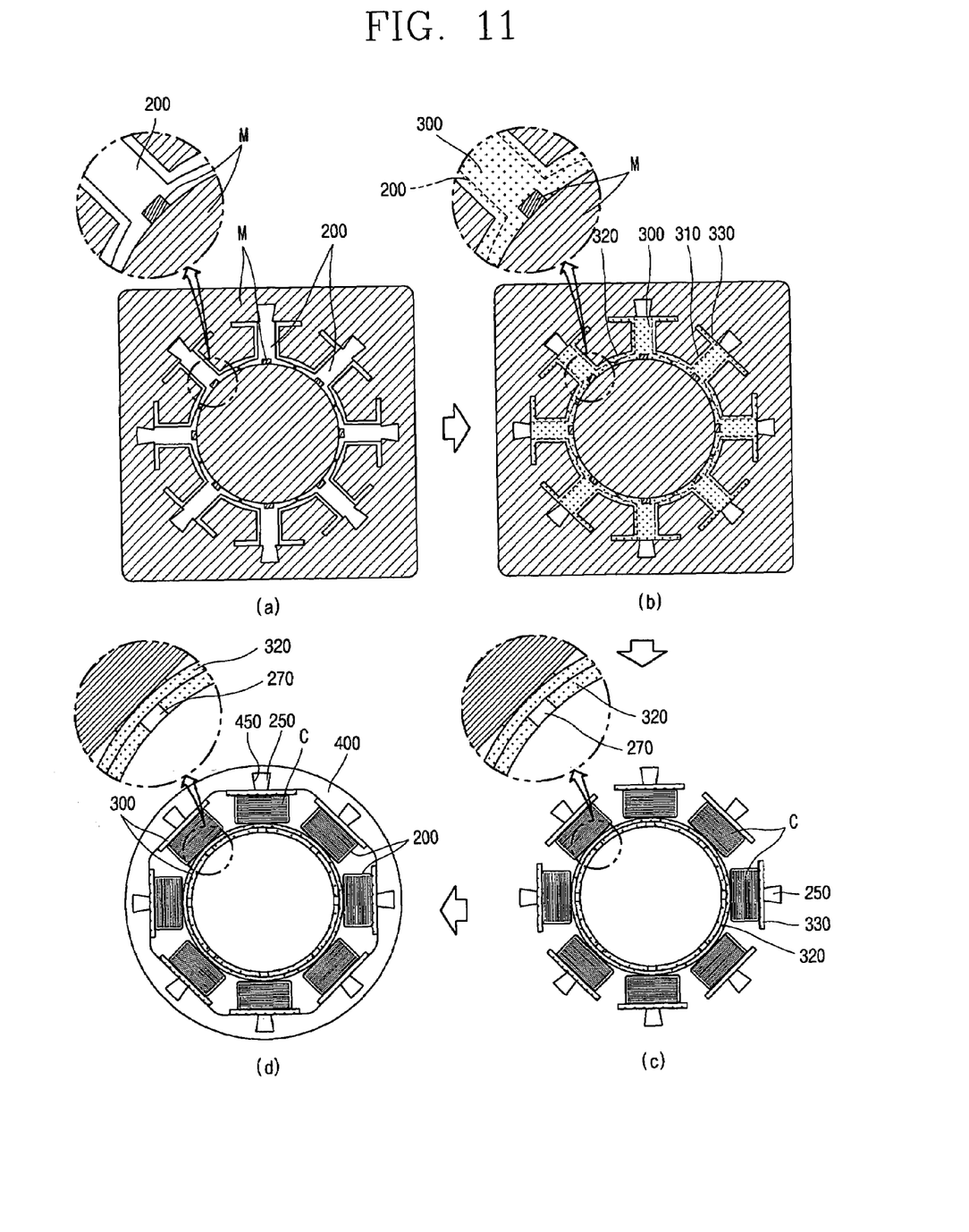
FIG. 11 is a plan view showing a manufacturing process of a core-coil stacked body in accordance with the second and third embodiments of the present invention.

FIG. 11 is a plan view showing a manufacturing process of a core-coil assembly of a motor in accordance with a second embodiment and a third embodiment of the present invention.

As shown, as in the first embodiment, the first step includes manufacturing teeth parts 200 by stacking a plurality of "T" shaped core thin boards one upon another and radially arranging and inserting the teeth parts 200 in a mold (M) having a predetermined shape. The second step further includes pressing a core pressing groove 270, which is positioned at an inner end of each teeth part 200, and the stopping protrusion 250 portion, which is positioned at an outer end of each teeth part 200, with a mold so as to prevent separation between thin boards of each teeth part 200, which is generated by molding pressure when injecting a molding liquid.

The third step includes drawing out the teeth parts 200 temporarily assembled by the inner molding portion 320 by separating the mold (M) therefrom and winding a coil (C) using a winder (not shown). At this time, as described in FIG. 8, the coil (C) is wound in an outer winding method in which a coil is wound from an outer side of each teeth part 200 toward its inner side by rotation of the winder 500 in a state that a stopping portion 510 of a winder table 520 adheres closely to a side of a winding stopping protrusion 290 of the inner molding portion 320.

The fourth step is the same as that of the first embodiment.

Hereinafter, effect of the present invention will now be described.

The core-coil assembly of the motor having such a structure may employ the so-called outer winding method of winding a coil from an outer side of the teeth part toward its inner side, and also the coil is wound successively. Accordingly, in the present invention, an assembling process can be simplified in comparison with the conventional art in which coils are separately wound and then connected through a separate PCB or a soldering process, and thus the productivity of a motor can be improved.

In addition, by pressing and supporting outer and inner sides of each teeth part with a mold when injecting a molding liquid, the core thin boards of each teeth part may be prevented from being separated by molding pressure, and thus a height difference between the teeth parts does not occur, thereby improving efficiency of a motor.

Also, when a coil is successively wound on a molding part using a winder, a temporary assembly comprised of the teeth part and the molding part is stably rotated because a stopping portion of the winder is caught by a winding stopping protrusion of the molding part. Accordingly, a wound state of the coil may be maintained in a good condition, and thus the coil is wound smoothly, so that productivity and performance of the motor can be improved.

As so far described, as for a core-coil assembly of a motor and its manufacturing method in accordance with the present invention, after teeth parts are manufactured, a molding part is formed in a mold so that inner sides of the teeth parts are connected. Accordingly, a coil can be successively wound in an outer winding method, and thus an assembling process is simplified to thereby improve productivity of a motor.

In addition, the outer and inner sides of each teeth part are pressed and supported in molding, thereby preventing a height difference between teeth parts, which may be generated by separation between the core thin boards of each teeth part due to molding pressure in injection of a molding liquid. Accordingly, efficiency of a motor is improved, and a temporary assembly comprised of the teeth part and the molding part is stably rotated when the coil is wound. Upon such stable rotation, productivity can be improved, and the coil can be regularly wound, thereby improving efficiency of a motor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A core-coil assembly comprising:
    a plurality of tooth parts, each of the tooth parts having a tooth end and a pole end;
    a molding part partially molded onto the tooth parts, the tooth parts being radially received by the molding part, the tooth end protruding from an outer circumferential surface of the molding part, an inner circumferential surface of the molding part being spaced radially outwardly from an inner face of the pole end; and
    a yoke part having a ring shape, the yoke part being coupled to the tooth end of each of the tooth parts to form a magnetic path.

2. The assembly of claim 1, wherein the tooth part includes stacked core thin boards.

3. The assembly of claim 2, wherein each core thin board is a silicon steel sheet.

4. The assembly of claim 1, wherein the yoke part includes stacked core thin boards.

5. The assembly of claim 1, wherein a stopping protrusion is located at the tooth end of the tooth part in a stepped manner, and a stopping groove is located in an inner circumferential surface of the yoke part so that the stopping protrusion is engaged thereinto.

6. The assembly of claim 1, wherein the molding part is a single, integral piece for receiving the plurality of tooth parts, and the molding part comprises:
    a middle molding part encompassing an outer side of the tooth part;

an inner molding part extendingly formed at an inner circumferential side of the middle molding part at a predetermined height and having a circular belt shape so that the tooth parts are connected to one another; and an outer molding part extendingly formed at an outer circumferential side of the middle molding part at a predetermined height and having a plate shape so that the tooth parts are isolated.

7. The assembly of claim 6, wherein the inner molding part is formed to be protrusive as high as the thickness of a coil when the coil is completely wound.

8. The assembly of claim 6, wherein the outer molding part is formed to be protrusive as high as the thickness of a coil when the coil is completely wound.

9. The assembly of claim 6, wherein the inner molding portion further comprises at least one winding stopping protrusion to engage with a stopping portion of a winder when a coil is wound using the winder.

10. The assembly of claim 9, wherein the winding stopping protrusion is straightly located between the tooth parts.

11. The assembly of claim 1, wherein the molding part includes at least one winding stopping protrusion extending from a bottom side of the flange to engage with a stopping portion of a winder when a coil is wound using the winder.

12. The assembly of claim 11, wherein the winding stopping protrusion is straightly located between the tooth parts.

13. The assembly of claim 1, wherein the molding part includes a flange extending radially inwardly from the inner circumferential surface of the molding part and being along the inner circumferential surface of the molding part.

14. The assembly of claim 13, wherein the flange is aligned with the inner face of the pole end.

15. The assembly of claim 14, wherein the flange includes a plurality of segments, adjacent segments being spaced apart by a groove to expose an upper side of the pole end.

16. The assembly of claim 15, wherein the groove exposes a portion of the upper side of the pole end.

17. The assembly of claim 16, wherein the groove is located to expose a middle portion of the upper side of the pole end.

18. The assembly of claim 15, wherein the molding part further includes a second flange below the flange, the second flange including a plurality of lower segments, adjacent lower segments of the second flange being spaced apart by a lower groove to expose a lower side of the pole end.

* * * * *